(12) United States Patent
Muller et al.

(10) Patent No.: US 9,009,076 B2
(45) Date of Patent: Apr. 14, 2015

(54) SYSTEMS AND METHODS FOR DYNAMIC DIGITAL ASSET RESOURCE MANAGEMENT

(75) Inventors: Marcus S. Muller, Tinton Falls, NJ (US); Anand Prahlad, East Brunswick, NJ (US); Srinivas Kavuri, South Plainfield, NJ (US); Andre D. Madeira, Laurence Harbor, NJ (US); Muath S. Ali-Ali, Eaton, NJ (US); Parag Gokhale, Ocean City, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 1255 days.

(21) Appl. No.: 11/612,440

(22) Filed: Dec. 18, 2006

(65) Prior Publication Data

US 2007/0198421 A1 Aug. 23, 2007

Related U.S. Application Data

(60) Provisional application No. 60/752,205, filed on Dec. 19, 2005.

(51) Int. Cl.
| | |
|---|---|
| *G06Q 20/00* | (2012.01) |
| *G06Q 20/12* | (2012.01) |
| *G06Q 30/06* | (2012.01) |
| *G06Q 50/18* | (2012.01) |
| *G06F 21/10* | (2013.01) |
| *G06Q 10/10* | (2012.01) |
| *H04L 29/06* | (2006.01) |

(52) U.S. Cl.
CPC ........ *G06Q 20/1235* (2013.01); *G06Q 30/0645* (2013.01); *G06Q 50/184* (2013.01); *G06F 21/10* (2013.01); *G06Q 10/10* (2013.01); *G06F 2221/2137* (2013.01); *H04L 63/10* (2013.01)

(58) Field of Classification Search
CPC . G06F 21/10; G06F 2221/2137; G06Q 10/10; H04L 63/10
USPC ...................................... 705/37, 52
See application file for complete search history.

(56) References Cited

U.S. PATENT DOCUMENTS

| | | | |
|---|---|---|---|
| 4,686,620 | A | 8/1987 | Ng |
| 4,995,035 | A | 2/1991 | Cole et al. |
| 5,005,122 | A | 4/1991 | Griffin et al. |
| 5,093,912 | A | 3/1992 | Dong et al. |

(Continued)

FOREIGN PATENT DOCUMENTS

| | | |
|---|---|---|
| AU | 2004227949 | 8/2010 |
| CA | 2498174 | 4/2010 |

(Continued)

OTHER PUBLICATIONS

White, Ron. "How Computers Work." Millennium Edition, 1999. Que Publishing.*

(Continued)

*Primary Examiner* — Calvin L Hewitt, II
*Assistant Examiner* — Nancy Loan Le
(74) *Attorney, Agent, or Firm* — Knobbe, Martens, Olson & Bear, LLP

(57) ABSTRACT

A system and method for providing a flexible licensing system for digital content is described. In some cases, the system utilizes tokens or other valuations to facilitate the purchase or exchange of content.

21 Claims, 11 Drawing Sheets

(56) References Cited

U.S. PATENT DOCUMENTS

| | | | |
|---|---|---|---|
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,321,816 A | 6/1994 | Rogan et al. | |
| 5,333,315 A | 7/1994 | Saether et al. | |
| 5,347,653 A | 9/1994 | Flynn et al. | |
| 5,410,700 A | 4/1995 | Fecteau et al. | |
| 5,448,724 A | 9/1995 | Hayashi et al. | |
| 5,491,810 A | 2/1996 | Allen | |
| 5,495,607 A | 2/1996 | Pisello et al. | |
| 5,504,873 A | 4/1996 | Martin et al. | |
| 5,544,345 A | 8/1996 | Carpenter et al. | |
| 5,544,347 A | 8/1996 | Yanai et al. | |
| 5,559,957 A | 9/1996 | Balk | |
| 5,619,644 A | 4/1997 | Crockett et al. | |
| 5,638,509 A | 6/1997 | Dunphy et al. | |
| 5,673,381 A | 9/1997 | Huai et al. | |
| 5,699,361 A | 12/1997 | Ding et al. | |
| 5,729,743 A | 3/1998 | Squibb | |
| 5,751,997 A | 5/1998 | Kullick et al. | |
| 5,752,041 A * | 5/1998 | Fosdick | 717/178 |
| 5,758,068 A | 5/1998 | Brandt et al. | |
| 5,758,359 A | 5/1998 | Saxon | |
| 5,761,677 A | 6/1998 | Senator et al. | |
| 5,764,972 A | 6/1998 | Crouse et al. | |
| 5,774,883 A * | 6/1998 | Andersen et al. | 705/38 |
| 5,778,395 A | 7/1998 | Whiting et al. | |
| 5,812,398 A | 9/1998 | Nielsen | |
| 5,813,009 A | 9/1998 | Johnson et al. | |
| 5,813,017 A | 9/1998 | Morris | |
| 5,875,478 A | 2/1999 | Blumenau | |
| 5,887,134 A | 3/1999 | Ebrahim | |
| 5,901,327 A | 5/1999 | Ofek | |
| 5,924,102 A | 7/1999 | Perks | |
| 5,950,205 A | 9/1999 | Aviani, Jr. | |
| 5,974,563 A | 10/1999 | Beeler, Jr. | |
| 6,021,415 A | 2/2000 | Cannon et al. | |
| 6,026,414 A | 2/2000 | Anglin | |
| 6,052,735 A | 4/2000 | Ulrich et al. | |
| 6,076,148 A | 6/2000 | Kedem et al. | |
| 6,078,901 A * | 6/2000 | Ching | 705/36 R |
| 6,094,416 A | 7/2000 | Ying | |
| 6,131,095 A | 10/2000 | Low et al. | |
| 6,131,190 A | 10/2000 | Sidwell | |
| 6,148,412 A | 11/2000 | Cannon et al. | |
| 6,154,787 A | 11/2000 | Urevig et al. | |
| 6,161,111 A | 12/2000 | Mutalik et al. | |
| 6,167,402 A | 12/2000 | Yeager | |
| 6,169,976 B1 | 1/2001 | Colosso | |
| 6,212,512 B1 | 4/2001 | Barney et al. | |
| 6,260,069 B1 | 7/2001 | Anglin | |
| 6,269,431 B1 | 7/2001 | Dunham | |
| 6,275,953 B1 | 8/2001 | Vahalia et al. | |
| 6,301,592 B1 | 10/2001 | Aoyama et al. | |
| 6,324,581 B1 | 11/2001 | Xu et al. | |
| 6,328,766 B1 | 12/2001 | Long | |
| 6,330,547 B1 * | 12/2001 | Martin | 705/38 |
| 6,330,570 B1 | 12/2001 | Crighton et al. | |
| 6,330,642 B1 | 12/2001 | Carteau | |
| 6,343,324 B1 | 1/2002 | Hubis et al. | |
| RE37,601 E | 3/2002 | Eastridge et al. | |
| 6,356,801 B1 | 3/2002 | Goodman et al. | |
| 6,389,432 B1 | 5/2002 | Pothapragada et al. | |
| 6,415,270 B1 * | 7/2002 | Rackson et al. | 705/36 R |
| 6,421,711 B1 | 7/2002 | Blumenau et al. | |
| 6,487,561 B1 | 11/2002 | Ofek et al. | |
| 6,519,679 B2 | 2/2003 | Devireddy et al. | |
| 6,538,669 B1 | 3/2003 | Lagueux, Jr. et al. | |
| 6,564,228 B1 | 5/2003 | O'Connor | |
| 6,658,526 B2 | 12/2003 | Nguyen et al. | |
| 6,779,024 B2 * | 8/2004 | DeLaHuerga | 709/217 |
| 6,898,286 B2 | 5/2005 | Murray | |
| 6,941,305 B2 * | 9/2005 | Magouirk et al. | 1/1 |
| 6,950,807 B2 * | 9/2005 | Brock | 705/38 |
| 6,963,859 B2 | 11/2005 | Stefik et al. | |
| 6,973,621 B2 | 12/2005 | Sie et al. | |
| 7,003,496 B2 * | 2/2006 | Ishii et al. | 705/52 |
| 7,213,269 B2 | 5/2007 | Orthlieb et al. | |
| 7,328,189 B2 * | 2/2008 | Ling | 705/41 |
| 7,360,252 B1 | 4/2008 | Torrubia-Saez et al. | |
| 7,366,679 B2 * | 4/2008 | Yuyama et al. | 705/10 |
| 7,389,263 B2 * | 6/2008 | Gladstone | 705/37 |
| 7,389,273 B2 * | 6/2008 | Irwin et al. | 705/59 |
| 7,519,827 B2 | 4/2009 | Anderson et al. | |
| 7,725,380 B2 * | 5/2010 | Oshima et al. | 705/37 |
| 7,797,373 B1 * | 9/2010 | Berger | 709/203 |
| 7,818,262 B2 | 10/2010 | Kavuri et al. | |
| 7,941,534 B2 * | 5/2011 | de la Huerga | 709/225 |
| 2001/0056413 A1 * | 12/2001 | Suzuki et al. | 705/418 |
| 2002/0007347 A1 | 1/2002 | Blumenthal et al. | |
| 2002/0007351 A1 | 1/2002 | Hillegass et al. | |
| 2002/0077988 A1 * | 6/2002 | Sasaki et al. | 705/59 |
| 2002/0082961 A1 * | 6/2002 | Abrahm et al. | 705/35 |
| 2002/0120726 A1 | 8/2002 | Padole et al. | |
| 2002/0128976 A1 * | 9/2002 | O'Connor et al. | 705/59 |
| 2002/0174011 A1 | 11/2002 | Sanchez et al. | |
| 2003/0005428 A1 * | 1/2003 | Roman | 725/1 |
| 2003/0131252 A1 * | 7/2003 | Barton | 713/193 |
| 2003/0200104 A1 * | 10/2003 | Heming et al. | 705/1 |
| 2003/0200151 A1 * | 10/2003 | Ellenson et al. | 705/26 |
| 2004/0024846 A1 * | 2/2004 | Randall et al. | 709/219 |
| 2004/0068455 A1 * | 4/2004 | Jacobus et al. | 705/36 |
| 2004/0093229 A1 * | 5/2004 | Plain | 705/1 |
| 2004/0117319 A1 * | 6/2004 | Oshima et al. | 705/75 |
| 2004/0128514 A1 | 7/2004 | Rhoads | |
| 2004/0138911 A1 * | 7/2004 | Oshima et al. | 705/1 |
| 2004/0210509 A1 * | 10/2004 | Eder | 705/37 |
| 2004/0249759 A1 * | 12/2004 | Higashi et al. | 705/59 |
| 2004/0255143 A1 | 12/2004 | Wemyss et al. | |
| 2005/0027657 A1 | 2/2005 | Leontiev et al. | |
| 2005/0065870 A1 * | 3/2005 | Yu | 705/37 |
| 2005/0091338 A1 * | 4/2005 | de la Huerga | 709/217 |
| 2005/0125819 A1 * | 6/2005 | Ono et al. | 725/14 |
| 2005/0165673 A1 * | 7/2005 | Brock | 705/38 |
| 2005/0204405 A1 | 9/2005 | Wormington et al. | |
| 2005/0289041 A1 * | 12/2005 | Chowdary | 705/37 |
| 2007/0106586 A1 * | 5/2007 | Mack | 705/36 R |
| 2007/0198422 A1 | 8/2007 | Prahlad et al. | |
| 2008/0133417 A1 * | 6/2008 | Robinson | 705/52 |

FOREIGN PATENT DOCUMENTS

| | | |
|---|---|---|
| DE | 69415115.7 | 9/1998 |
| DE | 60020978.4 | 6/2005 |
| EP | 0259912 | 3/1988 |
| EP | 0405926 | 1/1991 |
| EP | 0467546 | 1/1992 |
| EP | 0774715 | 10/1996 |
| EP | 0774715 | 5/1997 |
| EP | 0809184 | 11/1997 |
| EP | 0541281 | 4/1998 |
| EP | 0899662 | 3/1999 |
| EP | 0981090 | 2/2000 |
| EP | 1384135 | 7/2010 |
| GB | 2410106 | 9/2006 |
| GB | 2409553 | 4/2007 |
| GB | 2425199 | 8/2007 |
| GB | 2435756 | 12/2008 |
| JP | 4198050 | 10/2008 |
| JP | 4267443 | 2/2009 |
| WO | WO-95/13580 | 5/1995 |

(56) References Cited

FOREIGN PATENT DOCUMENTS

| WO | WO-99/12098 | 3/1999 |
|----|-------------|--------|
| WO | WO 00/04473 | 1/2000 |
| WO | WO 2005/091636 | 9/2005 |

OTHER PUBLICATIONS

Armstead et al., "Implementation of a Campus-wide Distributed Mass Storage Service: The Dream vs. Reality," IEEE, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

Non-Final Office Action for U.S. Appl. No. 11/612,443, Mail Date Sep. 30, 2008, 24 pages.

"Associate", Collins English Dictionary, London: Collins, 2000. Credo Reference [online] [retrieved on Jul. 30, 2009]. Retrieved from: <http://www.credoreference.com/entry/hcengdict/associate>.

"Right," Chambers 21st Century Dictionary, London: Chambers Harrap, 2001. Credo Reference [online] [retrieved on Jul. 30, 2009]. Retrieved from: <http://www.credoreference.com/entry/channbdict/right>.

Ron White, How Computers Work, Sixth Edition, Que Corporation, 2002. pp. 314-315.

Final Office Action for U.S. Appl. No. 11/612,443, Mail Date Mar. 30, 2009, 30 pages.

Kwok, S. H., "Digital Rights Management for the Online Music Business," ACM SIGecom Exchanges, vol. 3, No. 3, Aug. 2002, pp. 17-24.

International Search Report, PCT/US2006/062266, dated Oct. 17, 2007.

IBM Technical Disclosure Bulletin, vol. 24, No. 5, Oct. 1981 New York, US, pp. 2404-2406, K.L. Huff, "Data Set Usage Sequence Number".

Kwok, S.H., 2002, Digital rights management for the online music business, SIGecom Exch. 3, 3 (Jun. 2002), 17-24, DOI=http://doi.acm.org/10.1145/844339.844347.

Luis-Felipe Cabrera, et al. "ADSM: A Multi-Platform, Scalable, Backup and Archive Mass Storage System", Digest of Papers of the Computer Society Computer Conference (Spring) Compeon, US, Los Alamitos, IEEE Comp. Soc. Press, vol. Conf. (Mar. 5, 1995), pp. 420-427.

Non-Final Office Action for U.S. Appl. No. 11/612,440, Mail Date Mar. 31, 2009, 17 pages.

Operating Systems Review (SIGOPS), vol. 25, No. 5, May 1991, New York, US, "The Design and Implementation of a Log-Structured File System", p. 4, paragraph 3.3-p. 5.

European Search Report dated Dec. 16, 2011, Application No. 06 850 319.2.

* cited by examiner

US 9,009,076 B2

SYSTEMS AND METHODS FOR DYNAMIC DIGITAL ASSET RESOURCE MANAGEMENT

CROSS-REFERENCE TO RELATED APPLICATION(S)

This application claims priority to U.S. Provisional Patent Application No. 60/752,205, filed on Dec. 19, 2005, entitled SYSTEM AND METHOD FOR PROVIDING A FLEXIBLE LICENSING FOR DIGITAL CONTENT, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosures, as it appears in the Patent and Trademark Office patent files or records, but otherwise expressly reserves all other rights to copyright protection.

BACKGROUND

A license allows authorized users rights to content and (ideally) prevents unauthorized users from using content. For example, a software license agreement grants a user (or group of users) permission to use software from a software producer (or vendor, reseller, and so on). A user may be any legal entity (such a company that purchases software for employee use), an individual, a computing device interfacing with software, an "end user," and so on. One common license for end users is called an End User License Agreement (EULA). Generally, the license specifies the parameters of permission granted by an owner (such as a software producer) to a user (such as an end user). Often, these parameters assign definite and rigid terms of use, such as assigning a definite and pre-defined number of end users rights when providing a license for purchased software.

Generally, a digital content source (such as a producer, reseller, vendor, and so on) receives a request from a buyer (such as an end user or corporation) to purchase or license digital content. Once purchased, the source provides the digital content to the buyer. The source may provide the digital content and a license to the digital content to the buyer. The buyer may then use the digital content according to the rights defined in the license agreement between the source and the buyer.

For example, there are various areas in which digital content is bought or sold via the purchase of electronic objects. Some of this content includes software, music files, audio books, video files such as movies, digital objects in massive multiplayer role playing games, and so on.

Content sources attempt to ensure that users of content have paid for or otherwise have a right to their content. Many licensing systems have been developed for such attempts, providing registration requirements, security keys (such as a user password), or other digital rights management schemes. For example, a key may indicate that a company purchased ten licenses for software on the WINDOWS operating environment and five licenses for software on a UNIX environment. When an end user wants to the use the software, a digital rights management program verifies that the end user is from the company that purchased the ten licenses for software on the WINDOWS operating environment. However, should more than ten users want to use the software on WINDOWS, they may not be able to do so, as their key only provides access for ten users.

Thus, one problem with existing licensing systems is that entities often may not realize how many end users will eventually require access to software when the company purchases the software or other digital content. Additionally, the company may not know the operating systems of their end users, or the number of computers (e.g., many users now have a desktop at work and a laptop for home use), or the needs of users may simply change over time. Under existing systems, a company may receive a license with rigid use parameters, such as those described above, and be unable to facilitate its users with the existing license.

Because of existing license structures, users often find themselves having license agreements that are no longer needed or desired. Typically, a user will receive a new license with each purchase of digital content. As new digital content is created or updated by sources, users may wish to part with the older, outdated, or no longer useful digital content they own. However, due to a variety of reasons, such as financial reasons, users may not be able to justify purchasing new digital content when they still own older, less desirable digital content. Thus, typical licensing systems, including but not limited to the systems in the above example, may not meet or be created to consider the needs of users.

These and other problems exist with respect to existing licensing systems.

Figure 1:
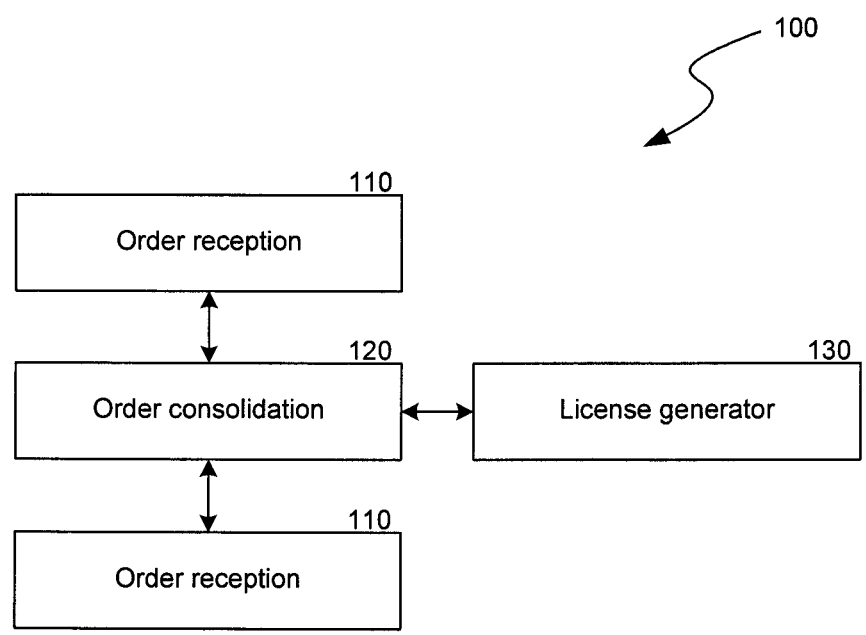
FIG. 1 is a block diagram illustrating an example of components used in a licensing system.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 1120 is first introduced and discussed with respect to FIG. 11).

DETAILED DESCRIPTION

Examples of the technology are directed to a system and method for licensing digital content to users. In some examples, a license contains one or more tokens that relate to purchased or subsequently purchased digital content. Digital content may be, for example, electronic or digital data objects such as software, digital information, applications, data files such as audio files and video files, multimedia content, games, text files, and so on.

A customer, such as a corporation, may purchase digital content and a license for the digital content from a content source. At the time of purchase, the customer may not know how many of its end users will need to use the purchased digital content. Instead of providing a license having an agreement for a discrete number of end users, the source may provide a flexible or modifiable license containing a number of valued tokens. For example, the license may contain 1000 tokens of a certain type, and 500 tokens of a different type. In this example, when the customer adds an end user, the system decrements the number of available tokens from the customer's license. Thus, the customer is able to purchase digital content without first knowing an exact number of end users. The system establishes a flexible licensing system between a customer and a content source.

In some examples, the content source provides a number of tokens to a customer when digital content is initially purchased by the customer. The source may provide to the customer a license key containing a certain number of tokens. As the customer continues to purchase additional content, the system decrements the number of tokens within the customer's license key.

In some examples, the system verifies the purchaser before providing digital content to the purchaser. For example, the system may establish that a purchaser is not authorized to receive digital content they have requested, and deny a purchase. The system may request a user profile from the purchaser, and make decisions based on the user profile.

In some examples, the system may establish that a purchaser does not have system resources appropriate for digital content they have requested, and deny the purchase. In these examples, the system may enable the purchase of digital content after determining the validity of the purchaser or the purchaser's resources, and decrement the tokens in a purchaser's license key accordingly.

In some examples, the system may provide for the exchange of digital content between a purchaser and a content source. For example, a purchaser may exchange the rights to older content for tokens to be used in purchasing new content. The system may dynamically valuate digital content to determine an exchange value.

Various examples of the system will now be described. The following description provides specific details for a thorough understanding and enabling description of these examples. One skilled in the art will understand, however, that the system may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Suitable System

Referring to FIG. 1, a block diagram 100 illustrating an example of components used in a licensing system is described. In creating licenses for users of digital content, a content source, such as a software provider, may receive one or more orders from customers for digital content, such as software. For example, the source may receive orders via order reception components 110 (e.g., via customer service centers, online ordering facilities, and so on). The system may require the customer to provide a customer number (originally provided by the source), a serial order number unique to each order placed by a customer (assigned by the source, such as at reception component 110), and information related to the software components desired to be purchased by the customer (e.g., part number, SKU, quantity, and so on).

In some cases, customers may place many different orders in a given time period. Additionally, different sales entities may sell similar software components from a given content source. The content source may consolidate some or all orders for a customer via an order consolidation component 120. The order consolidation component 120 may check to verify that the different sales entities use the same customer number for a given customer. For example, the component may poll the order servers of third party vendors to consolidate orders for a customer.

Once an order is placed (or, once orders are consolidated), the customer may present their customer number and serial order number to license generation component 130 in order to receive a license key for the content they wish to purchase. Component 130 may confirm whether the serial number of the order is valid for the customer, and validate the order. Once the order is validated, the system validates the customer's configuration needs, validates any business rules associated with a third party vendor (such as the vendor providing the software), validates any business rules specific to the purchased content, and generates a license for the user.

Figure 2:
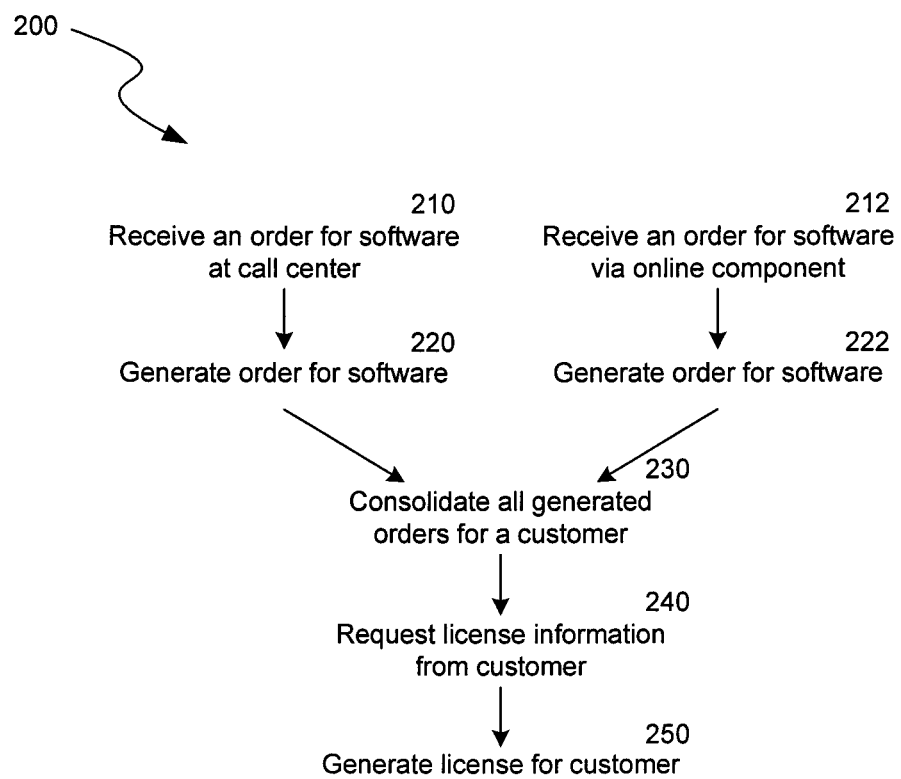
FIG. 2 is a flow diagram illustrating an example routine for generating a license for digital content.

Referring to FIG. 2, a flow diagram illustrating an example routine 200 for generating a license for digital content is described. The system may receive an order for software from a customer at a call center (step 210), via an online ordering module (step 212), or in other ways. The customer may be an end user or a group of end users. The received order may include information related to a customer number, a serial order number for the customer, and the desired software to be purchased. In steps 220 and/or 222, the system may use the received order information to generate an order for the desired software. In step 230, the system may check the system for more than one order from a customer, and consolidate any orders belonging to one customer. Additionally, the system may verify the orders to confirm that every order from a customer contains the same customer number and valid serial order numbers. In step 240, the system receives license request information from the customer, including the value of the license and amount of value to add to the license. For example, the system may generate a token-based license for the customer. Further details with respect to the value of a license will be discussed herein. In step 250, after the customer is verified, the system generated a license for the customer.

Token-Based Digital Rights Management

Figure 3:
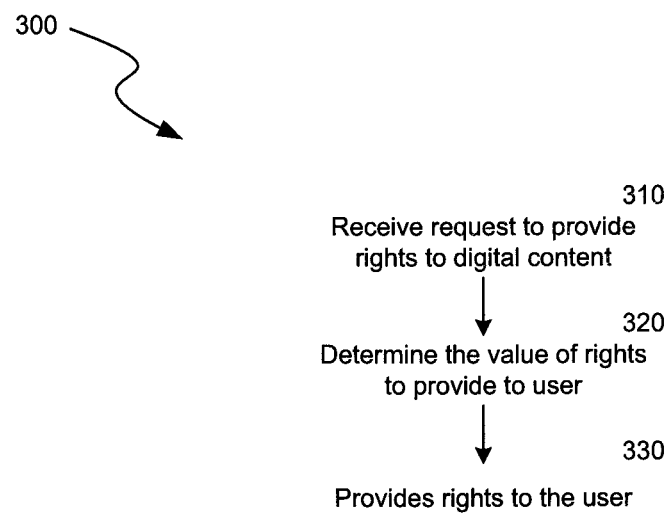
FIG. 3 is a flow diagram illustrating an example routine for generating a token-based license for digital content.

Referring to FIG. 3, a flow diagram illustrating an example routine 300 for generating a license under a token-based digital rights management system is described. In step 310, the system receives a request to provide rights to a user of digital content. For example, the system may receive a request from a user to obtain a license to run a certain software program on his/her computer.

In step 320, the system determines the value of rights to assign the user. For example, the system determines the user is to receive X number of tokens for a specific software program, where each token enables the user to run one copy of the software program. In another example, the system determines the user is to receive X number of tokens for a specific software program, Y number of tokens for an alternative software program, and Z number of "wildcard" tokens that may be used for any software programs.

In step 330, the system provides rights for digital content to the user. For example, the system provides a license key containing or associated with the tokens described herein.

In some cases, a token is data used to facilitate the association of one or more possible characteristics of digital content with an item of digital content. A token may be an increment of assignable or assigned rights of digital content to a user. A token may not be fully transferable from one entity to any other entity. A token may be a digital object used as an exchange value to access content. A token may represent the monetary value of a specific item of digital content. A token may represent other characteristics of or associated with digital content, such as fixed or relative values of the content, a type of use permitted (e.g., permanent or evaluation), a time period for use (e.g., a trial period of a specified number of days), and so on. A token may represent a specific type of digital content, such as a particular software agent for use in a specified operating system, by a specific client, or in a specific data application, multiple items of digital content classified as being of a common type by a content source, an audio file, and so on. A token may be an indication of the compatibility of specified digital content with other computer devices or software, or any other characteristic which would be useful to a content source in determining whether and how to license or otherwise provide digital content to a user.

Tokens may be specific to certain digital objects, or may be generic to all types and values of digital objects. For example, a token may represent one certain type of digital object, having a specific value. On the other hand, tokens may represent increments of value, and the system may value digital content at a defined number of generic tokens. The system may enable users to obtain digital content via specific tokens, generic tokens, or a combination of both. For example, in order for a user to obtain certain digital content, the system may require one specific token for the content, many generic tokens for the content, or one specific token for the type of content and a number of generic tokens to reach the value of the content. Other combinations are of course possible.

Users may be motivated to purchase more tokens than needed in an original purchase for a variety of reasons. In some cases, they are frequent users of content from a source, and may purchase many tokens up front to avoid purchasing many individual licenses later on. In some cases, the source may discount licensed software to motivate users to purchase additional tokens to be used at a later time. That way, a source may facilitate later purchases by providing additional, discounted tokens to users.

Figure 4:
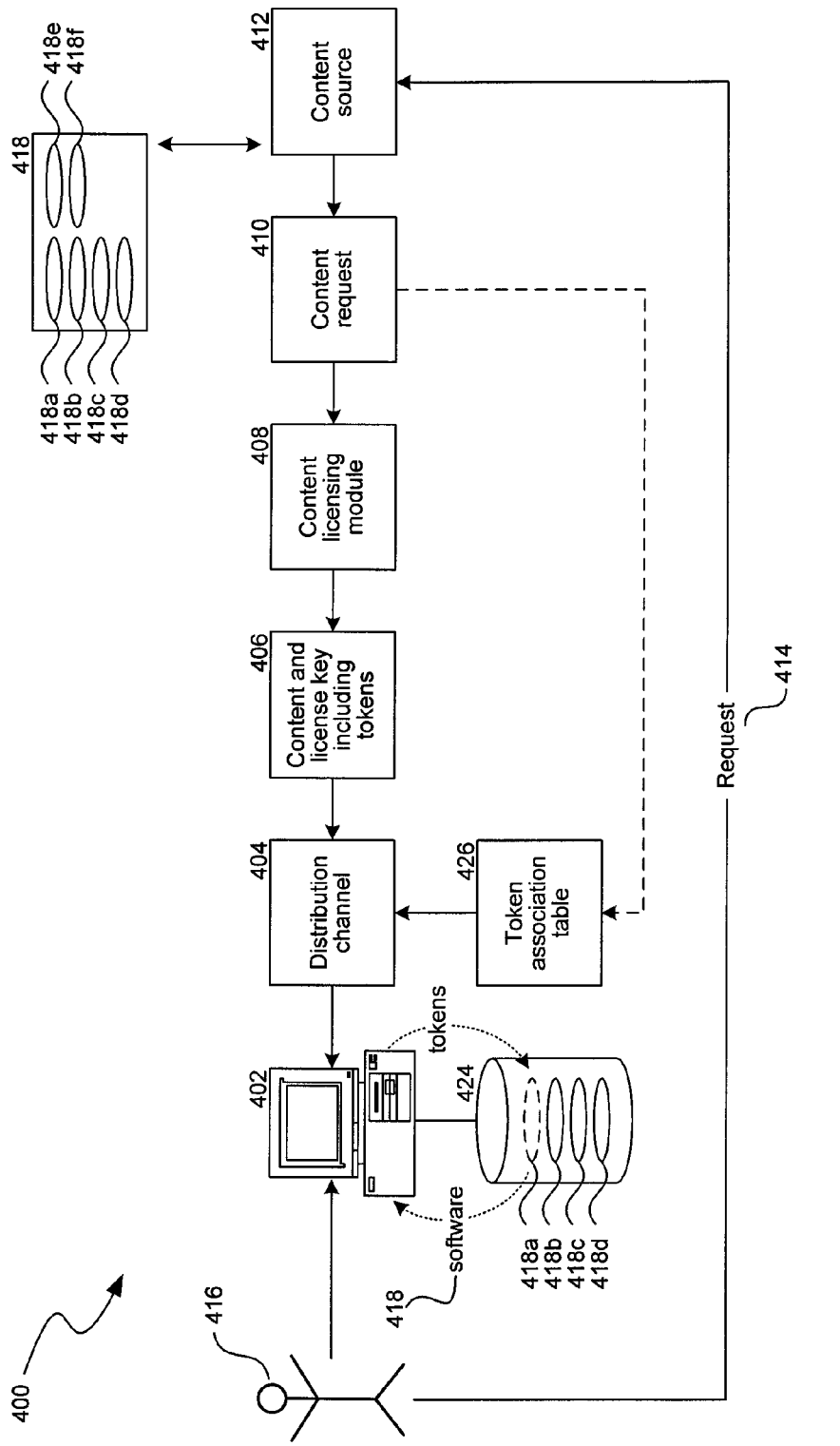
FIG. 4 is a block diagram illustrating an example of components used in generating a token-based license for digital content.

Referring to FIG. 4, a block diagram illustrating an example of components used in generating a license for digital content is described. A system 400 may include a content source 412 that produces, generates, resells or otherwise distributes digital content 418, such as software. As described herein, digital content may be discrete data objects such as individual software applications, electronic information, electronic files, or individual agents, or include, for example, some or all features or bits of features of an application, modules, agents, discrete data objects, packages of software products, or other aspects of software products. Digital content may be a package containing discrete digital objects 418A to 418F, or may be distinct digital objects 418A to 418F.

Content source 412 may connect with a content licensing module 108. Content licensing module 408 may connect to a distribution channel 404. Content licensing module 408 may be related to source 412, or may operate independently to provide content licensing services for content sources. For example, licensing module 408 may create software licenses, including customizing license keys for software and assigning one or more tokens to be included in the license keys, as described herein.

The distribution channel 404 may transmit content 418 from the source 412 via module 408 to a user 416, such as a purchaser of content from the source 412. The distribution channel 404 may be communicatively coupled to the content source 412 and a user computer 402 via a network, such as a LAN, WAN, the Internet, a wireless network, or other electronic channels. In some cases, the distribution channel 404 may provide a Graphical User Interface (GUI) to enable the purchasing and selling of software 418. Additionally, the distribution channel 404 may be a transport system (such as a package delivery service) or a store selling digital content, in order to facilitate users purchasing content on removable media, such as on DVDs, CD-ROMs, CDs, and so on.

Referring back to FIG. 4, in one example, a user 416 sends a request 414 to software source 412 to license digital content from the source, such as software 418. The user 416 may request digital content, such as a single item of software 418, a particular module, or many pieces or features of software 118A, 118B, 118C, 118D, 118E, 118F, or combinations thereof.

In this example, the software source 412 forwards the user request 414, and optionally, the requested software 418, to a software licensing module 408. The software licensing module 408 reviews request 414 (or the combined request 410) and generates a license key 406 that includes one or more tokens. The license key 406 may include other information, such as a token association table 426, to be discussed herein. The license key 406 provides the user with rights to access digital content, and may also include a security code to access the digital content and other authorization verification information, such as information that ensures the user is authorized to access the content.

As mentioned herein, a token included in a license key may be a data structure or other data item or object associated with or containing information that facilitates or otherwise permits access to certain digital content. For example, token information may indicate or otherwise define arbitrary values associated with access to digital content. For example, in some examples, one or more tokens may be required by a content server at a content source or other provider to provide access to an item of digital content. Alternatively, in some cases a token may include the license key.

Referring back to FIG. 4, module 408 may transmit the license key 406 via distribution channel 404 to user terminal 402, where the key 406 may be stored in memory 424. In some cases, the system encrypts the key 406 (e.g., using a symmetry-based algorithm or other encryption methods) and transmits the encrypted key 406 via a secure channel. In some cases, the license key 406 includes data fields for information relating to software associated with the license, for information relating to system configurations in which the software is used, for tokens, and so on. For example, a license key 406 may include fields containing characters associated with or identifying a software product identifier, a license version or type, a storage operation cell system identifier, an equipment manufacturer identifier, a configuration identifier, a number and type of tokens, and so on. The system may provide access to the information in the license key 406 to user systems, user servers, software sources or vendors (such as during software updates), and so on. The system may provide access to authenticate or verify a user's right to access digital content, to authenticate a user during future purchases of digital content, to track a user's acquisition of digital content, to secure access to digital content, to identify user system configuration for software recommendations, to confirm token availability for digital content purchases, and so on.

Referring back to FIG. 4, a license key 406 may contain one or more tokens, where the tokens may have a specific value and be of a certain type. Although shown in FIG. 4 as being included with a license key, the system may provide tokens in other ways, such as in a separate file or a separate data store controlled by a content source. For example, the system may manage token information at a server or other management component of a software or content source.

As described herein, in some examples, the system associates tokens with a license key 106 obtained in connection with a content purchases, such as a purchase of software. In these examples, a user may purchase data storage management software that is to be used in collaboration with an application or data-specific data agent for each client or application the user operates on the user's computer or system. The system may include tokens associated with such applications or agents in the encrypted license key obtained with the software purchase. After purchasing software, the user may acquire or install additional software products unknown to the user during the original software purchase. Thus, by providing tokens in a license key 406, the system enables the user flexibility in acquiring additional software modules or features.

Figure 5:
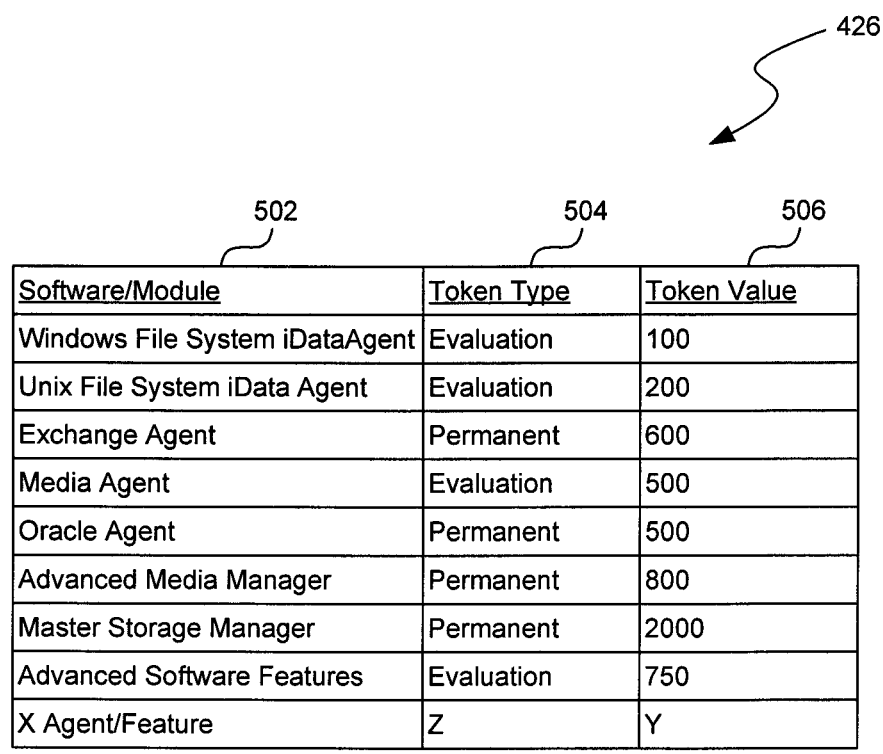
FIG. 5 is a table illustrating an example data structure for mapping tokens to digital content.

Referring to FIG. 5, a table 426 illustrating an example data structure for mapping tokens to digital content is described. Token association table 426 may include information related to associating a token value with digital content, such as a software item. Table 426 may also include information or data indicating a software identifier, a license version, a license type (e.g., permanent, beta, test, evaluation, temporary, and so on), information about the system configuration or related components, original equipment manufacturer information, a configuration identifier, and other information described herein. In some cases, the system may transmit some or all of the information in table 426 with the license key 406, inside the license key 406, or before or after the system transmits the license key 406.

For example, the system may transmit token association table 126 indicating, for example, software available for installation and respective associated token values, to the user and may store the table 426 in memory 424 that may be located on a server that accesses and monitors all activity on a user's system. The server may use the table 426 to help verify or authenticate user rights to digital content, as described herein.

In some examples, the system may store or may associate a token association table 426 with a user's server software, such as with a data management module provided by a content source (such as the CommCell server provided by CommVault Systems, Inc., of Oceanport, N.J. and described herein).

In some examples, data or information in a token association table 426 may not be changed after the system provides the table 426 to a user. In these cases, the system provides a user with security by not allowing the content source to have access to a user's system. However, in some examples, the system may store a token association table 426 on a server of a content source and a user system may have to query the content source server prior to any new installation in order to receive an updated token association table. In some examples, a software source 412 may process a user request for digital content and compare token association information locally accessible at the software source 412, and return the results of the comparison to the user.

Referring back to FIG. 5, a data table, such as data table 426, identifies digital content, such as software/modules 502, their associated token types 504 and token values 506. The data table 426 may be any data structure capable of associating token characteristics, such as token values 506, with corresponding digital content, such as software or modules 502. For example, an iData Agent may have a token value of 100 for a Windows File system or a value of 200 for Unix File System. Other software 502 may have other similar or different values. For example, an Exchange Agent, permanent version has a value of 600 tokens, a Media Agent, evaluation version has a value of 500 tokens, and an Oracle Agent, permanent version, has a value of 500 tokens. Master storage managers, advanced media managers and advanced software features may have other token values, generally referred to as value Y, and modules, software features, agents, software applications or other software may be of a general type Z. Token types 504 include, Evaluation, Permanent, and others described herein. The token type may relate, for example, to a particular software feature, module, agent, component, or other aspect, and thus be used for a particular software aspect.

In the example of FIG. 5, the table 426 indicates that installation of an Oracle Agent requires one or more permanent type tokens having a value of 500, and installation of a Media Agent for an evaluation period, such as 30 days, requires or consumes one or more evaluation type tokens having a value of 500. Many permutations of token combinations may satisfy the token value requirement. For example, the system, under the current example, will assign rights to a Media Agent for an evaluation period if a user contains 1 evaluation type token of value 500, five hundred evaluation type tokens of value 1, 20 evaluation type tokens of value 25, and so on.

Figure 6:
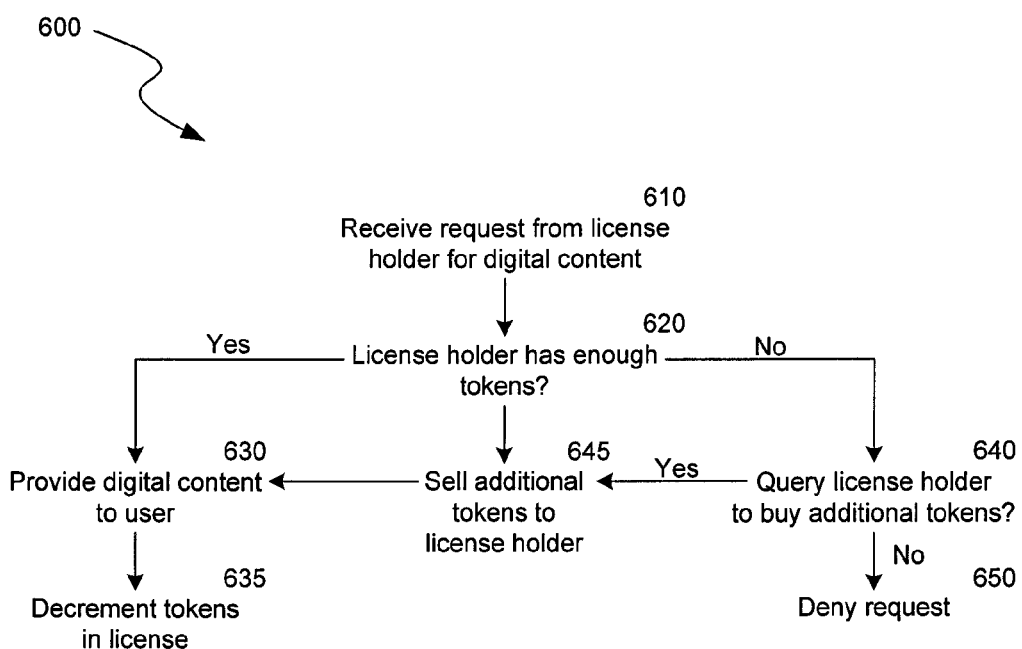
FIG. 6 is a flow diagram illustrating an example routine for decrementing the number of tokens in a license.

Referring to FIG. 6, a flow diagram illustrating an example routine 600 for providing content to a user having a token-based license key with tokens is described. In step 610, after a user has purchased a license or when a user is purchasing a license, the system receives a request from a license holder (or soon to be holder) for use of digital content. In step 620, the system checks the number of available tokens (and their values) in the user's license key, and determines if the user has enough tokens. If the user has enough tokens, the routine proceeds to step 630, else the routine proceeds to step 640. In step 630, after determining the user has enough tokens, the system provides the user with the requested digital content and, in step 635, decrements the tokens in the user's license key that equal the amount needed for the requested content. In step 640, when the user did not have enough tokens, the system may query the user to determine if the user would like to purchase additional tokens to enable the system to provide the user with the requested content. If the user wants to purchase additional tokens, the routine proceeds to step 645, else the routine proceeds to step 650, and the system denies the user's request for digital content. Alternatively, the system may deny the request without querying for an additional purchase when the system determines the user does not have sufficient tokens for a content request. However, if the user wishes to obtain the content, the system, at step 645, sells the additional tokens to the user (or, additional tokens for the request content and for future content requests), and provides, in step 630, the content to the user.

For example, a user maintains a license for content with a software source, and wishes to receive ten copies of the newest data storage software. The system determines that ten copies requires 50 tokens, and determines that the user's license key contains 80 tokens suitable for the requested software. The source provides the user with the ten copies and decrements the number of tokens in the user's license key from 80 to 30.

In some cases, the system values tokens based on type. For example, 500 evaluation type tokens may require a payment by a user totaling $500.00, whereas 500 permanent type tokens may require a payment by a user totaling $5,000.00. In other cases, tokens may have no associated type. In these cases, the system may designate content to a user as being for evaluation or for permanent use based on the value of tokens provided by the user. That is, some or all tokens may have an equal value, with an installation of content for an evaluation period requiring fewer tokens than an installation for permanent use.

In some examples, a token indicates the digital content item for which the license key is generated. For example, the system may provide data storage management software purchased for a large enterprise with a license key having one or more tokens totaling a value of 20,000. The system may provide the same software to a smaller enterprise (such as an enterprise having fewer storage feature requirements) with a license key having one or more tokens totaling a value of 7,000.

In some examples, the system associates a license key 406 with a software item. In some cases, the license key is embedded in the software item. The license key may include a data structure, such as table 426, or other relational database that associates a token value and token type with a software item or license type. The system may employ a license generator and/or license module, or both, to create the table 426, and may write such information to a header file or other metadata file. The system may use the licensing module to determine whether the license key includes tokens of a particular value and type. The license key information included in the license key may also indicate information related to other appropriate software components that may be used with the software. For example, the system may include a table of related software, modules or other items, such as appropriate features, data agents, media agents, storage manager, and so on. In some examples the system may include a user profile, as described herein, to generate aspects of a license key, such as license types, token values, and so on.

Digital Resource Management License Verification

In some examples, the system includes or encodes data in a license key that indicates what types of digital content, such as one or more software applications or modules, may be installed in a particular client system. In some cases, the data may be a configuration identifier that may identify one or more types of digital content, and may be encoded in a license key transmitted to a user's server. In these examples, when a user requests installation of digital content, content management software (at the user or at a source) performs a check or comparison to determine if the requested digital content contains a configuration identifier indicating compatibility between the user's resources and the requested digital content. Upon verification, the system may then permit the user to install software, provided some or all criteria for installation, such as the user having enough tokens, are satisfied.

The system may use configuration identifiers, or other indicators, to supply information to a source relating a user's software or hardware configurations and one or more appropriate software or hardware configurations for operating software to be purchased by the user. For example, a configuration identifier may include information about data storage management software purchased by a user and the storage management architecture employed by the user. The system may use a configuration identifier when purchasing additional related software or content. For example, if a user requests additional software, the system, before or after determining whether the user license contains a sufficient amount of tokens, may check the configuration identifier to determine whether the requested additional software is appropriate for the user's system configuration or resources.

Figure 7:
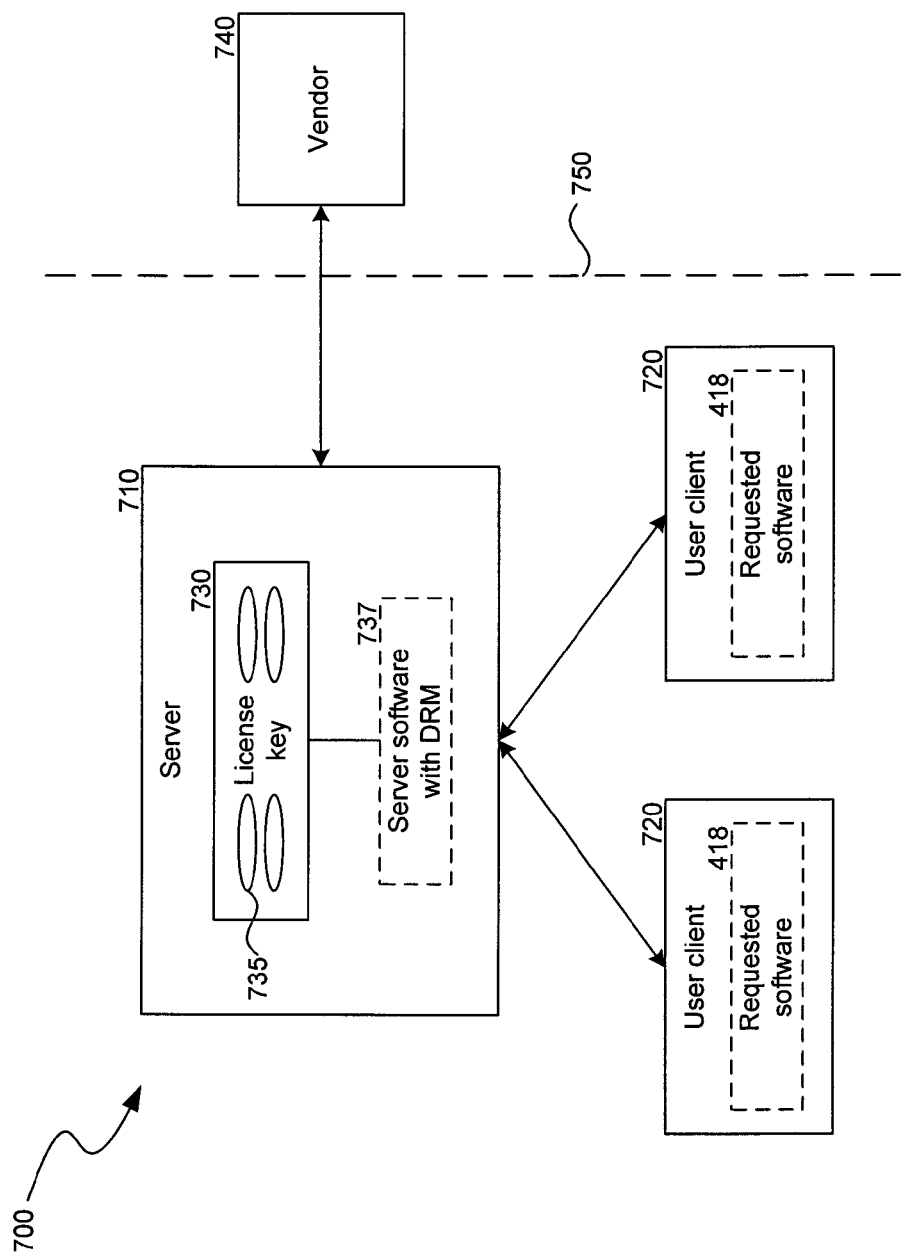
FIG. 7 is a block diagram illustrating a content distribution and licensing system.

Referring to FIG. 7, a block diagram illustrating a content distribution and verification system is described. Software 418 or other digital content may be installed on a server 710, a user system 720, or be remotely installed (not shown) and accessed by a user system 720. The server 710 may be any server capable of operating software with digital rights management functionality (such as a CommCell server provided by CommVault Systems, Inc. of Oceanport, N.J., described herein). In some cases, the server 710 monitors the one or more user clients 720 and any software installed thereon for which user has requested access. The user client 720 may be any network system comprising one or more components, such as a data storage management system described herein, or a system component, and may be communicatively coupled to server 710 or data storage management components such as media agents, data agents, storage managers, or other components. The system may store a license key 730, which may include tokens 735, on server 710.

In some examples, a user sends a request for software 418 (such as software related to software currently on the user's computer) to a software vendor 740. The vendor 740 may be a software provider, such as a manufacturer, reseller, distributor, and so on. In some cases, the vendor 740 and server 710 or clients 720 are separated by a security protocol 750, such as a firewall, to limit and control communication between the vendor 740 and server 130 or clients 140. The vendor 740 receives the software request, such as a customer order described herein. In response to the request, the vendor 740 may authenticate the user by obtaining user information, such as a customer number or other information (e.g., user identifier information such as the user's IP address, user's log in name, user's profile, and so on).

The vendor, upon authentication, provides a license key 730 to server 710 (or, in some cases, such as for previous customers, the license key 730 may already reside on server 710). The license key 730 may contain tokens 735, as described herein. Server software 737, residing on the server 710, may operate to determine, among other things, a sufficient number of tokens or token values exist to permit installation of the requested software 418 at a user client 720. In some cases, the decision to permit installation of the requested software 418 is performed by the server 710. In some cases, the server software 737 may also compare the type of software 418 requested with the types identified in a configuration identifier to determine whether the user is permitted to install the requested software 418.

The server software 737 may use other information for determining whether to permit installation of requested software, such as information from a token association table. In some cases, the software 737 may communicate with server 710 and vendor 740 to determine authorization. For example, the vendor 740 may communicate with server 710 to determine the number and type of tokens 735 contained in the license key 730 in order to confirm that there are sufficient tokens 735 to purchase the requested additional software. In addition, the vendor 740 may query the server 710 to obtain user system configuration information in order to confirm that the requested software is appropriate for the user's system

720. Vendor 740 may also query the server 710 in order to obtain user system monitoring information.

User system monitoring information may include information relating to the configuration of a user system 720, including, for example, software 418 installed on the system, system components, or other information including verification or user profile information. For example, the software 737 may monitor the number and type of tokens consumed, the license types used or available, the number of user clients on which digital content is installed, and so on. In some cases, the server 710 monitors the user system 720 on a periodic basis to confirm software licenses or access rights to software 418, to check system functionality, and so on. The system may store such information in a data store accessed by server 710 and, in some cases, by vendor 740. The system may use such licensing information to authenticate a user in future software purchases or installation requests and to determine whether to permit installation of software onto a user's system.

Figure 8:
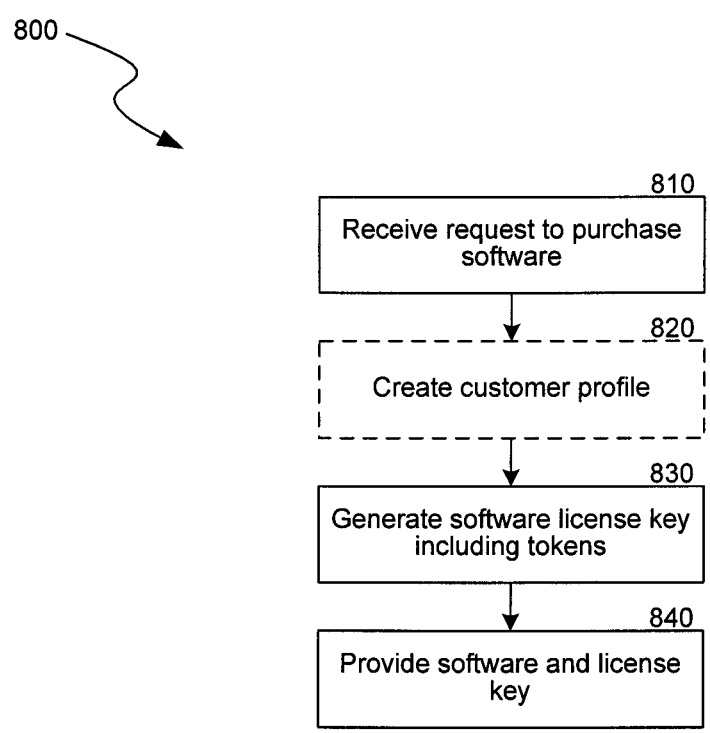
FIG. 8 is a flow diagram illustrating an example routine for verifying a purchaser of content.

Referring to FIG. 8, a flow diagram illustrating an example routine 800 for verifying a purchaser of content is described. In step 810, the system receives a request from a user for digital content, such as software or software features. The system may receive the request via a software provider, a software source, an intermediary such as a software distributor or reseller who handles the request directly or conveys the request to the software source, and so on. In some cases, the software request is a request for an initial purchase of software. In such cases, the routine proceeds to step 820, and if the customer is new to the system, the system obtains information relating to the user and stores the information as a user fingerprint or user profile. In some embodiments, a user profile includes information related to a customer, such as a customer's system configuration, a customer server identifier, reseller information, license types consumed, license types available, token data (such as the number of permanent and evaluation tokens), the number of tokens consumed, the number of tokens available, IP address, registration verification, customer number, and so on.

In some examples, the system checks a user profile associated with a user to possibly deter a user from unauthorized use or access to software. In these examples, the system supplies user information to a software source or vendor when a user requests digital content. Some of the supplied information may include a user's IP address, a user name, the user's credit card information, the user's system configuration, the user's customer number, and so on. The software source may store such user information in a data store (such as with user transaction information). During a request for software, the software source may consult the user information database to authenticate or verify a user making the request. In some cases, where some user information changes between user transactions (such as a changed IP address, credit card, user name, and so on), the system may set a flag or alert to further verify the user). In some example, the system may employ a manager or administrator to confirm a user's identity before a transaction is completed.

In some examples, the system obtains or creates a fingerprint or user profile at a point of initial sale and checks and/or tracks the profile when a user makes further purchases. The profile (or registration process used in created the profile) of the profile may include questions relating to the software purchase, to user-related information, to user systems, and so on. In these examples, when a user contacts a software source or other intermediary to purchase software, the system accesses the user profile to identify the user and confirm that subsequent software purchases are authorized for the user.

For example, a user fingerprint or profile may indicate that the user purchased data storage management software for use in an enterprise that has clients generating Microsoft Exchange data and the software includes licenses for particular software and tokens of a certain type and value. If the user seeks to purchase media agents for Oracle data, or data agents for financial applications, the software source may suggest that such items are not appropriate for the user and recommend the purchase of Microsoft Exchange media agents and data agents or other Microsoft Exchange appropriate components.

The software source or other intermediary may also use the fingerprint or user profile to provide technical assistance for a user. For example, the system may use a user profile to determine the system architecture in use or software items recently purchased by the user. Additionally, when monitoring a user at a user system, the system may compare the IP address of the system with the IP address indicated in a user profile to ensure that the user profile and system IP address are consistent.

Referring back to FIG. 8, after receiving a request from a user to purchase software and, optionally, creating a new user profile for the user, the system, in step 830, generates a software license key for the requested software, as described herein. The software license key may include one or more tokens of one or more types. The system consumes a specified amount of tokens when a user installs or otherwise acquires additional software items. The system, in step 840, provides the generated software license key and requested software to the user.

Figure 9:
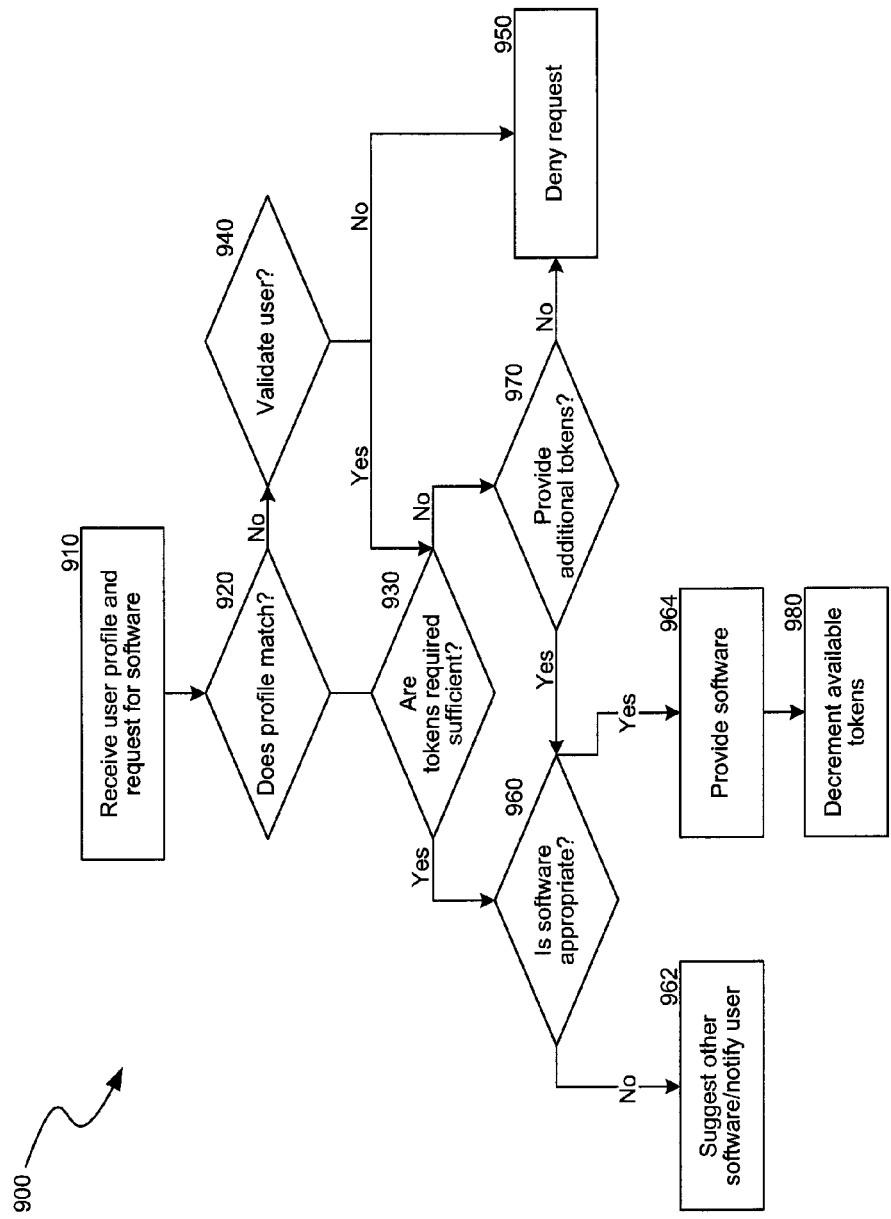
FIG. 9 is a flow diagram illustrating an example routine for verifying a purchaser of content and providing the content to the purchaser.

Referring to FIG. 9, a flow diagram illustrating an example routine 900 for verifying a purchaser of content and providing the content to the purchaser is described. In step 910, the system receives a request for software from a user, including an identification of the software and a user profile providing information about the user. In decision block 920, the system determines if the user profile matches an authorized user profile. For example, the system may look to a user's SKU or other user information contained in the profile. If the user profile matches, the system validates the user and routine 900 proceeds to decision block 930, else the routine 900 proceeds to decision block 940. In decision block 930, the system checks the number of tokens contained in a user's license key, as described herein. If the user's license key contains a sufficient number of tokens for the requested software, the routine proceeds to decision block 960, else the routine proceeds to decision block 970. In decision block 960, the system determines if the requested software is appropriate for the user, or if the user is authorized to obtain the requested software, as described herein. If the user is authorized, the system, in step 964, provides the user with the requested software and decrements or deletes, in step 980, the appropriate tokens in the user's license key. If the user is not authorized to use the requested software, or the system determines the software to be inappropriate for the user's resources, the system, in step 962, may suggest other software or otherwise notify the user.

Back in decision block 930, when the user does not have enough tokens to purchase the requested software, routine 900 proceeds to decision block 970, and the system queries the user to determine if the user would like to purchase or otherwise acquire additional tokens. If the user decided to purchase additional tokens, routine 900 proceeds to step 964 and the system provides the requested software, else routine 900 proceeds to step 950 and the system denies the user's request for software.

Back in decision block 920, if the system cannot verify the user, routine 900 proceeds to decision block 940, and attempts to validate the user. For example, the system may request additional information from the user, or may query a system administrator to validate the user. If the user is validated, routine 900 proceeds to decision block 930, else routine 900 proceeds to step 950 and denies the user request for software.

Thus, in some examples, the system checks if a user is authorized to obtain digital content, checks if a user's license authorizes obtaining digital content, and checks if a user maintains resources or other systems that are appropriate for the content.

Exchange of Digital Assets

In some examples, the use of tokens or other value indicators enables the exchange of digital assets between users and providers. For example, in some of the cases described herein, a user may not have enough tokens (or tokens of a proper type) to purchase digital content. In these cases, the system enables the user to exchange content previously purchased (or tokens representing the previously purchased content) for tokens to purchase other content.

Figure 10:
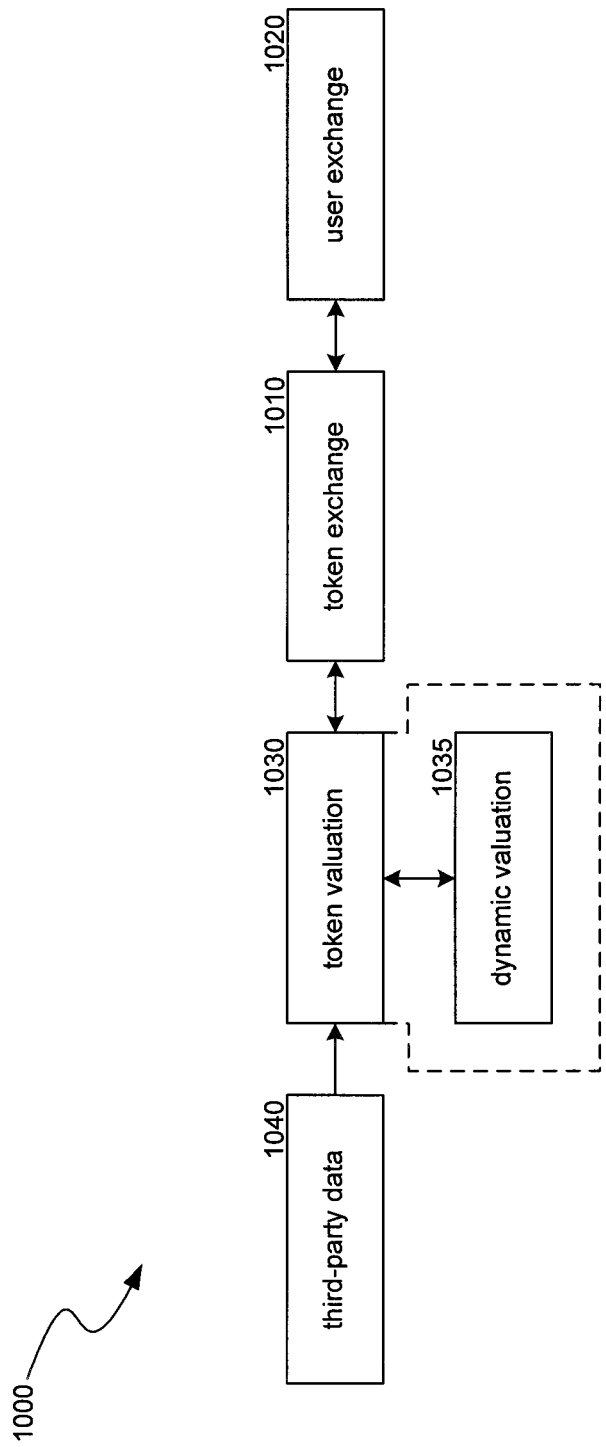
FIG. 10 is a block diagram illustrating example components of a dynamic digital asset exchange system.

Referring to FIG. 10, a block diagram illustrating example components of a dynamic digital asset exchange system is described. For example, the system may contain a token exchange component 1010, a user exchange component 1020, a token valuation component 1030, including a dynamic valuation component 1035, and/or a data source component 1040 that provides trend or other factual data to the system. The functions of these components are described herein.

Figure 11:
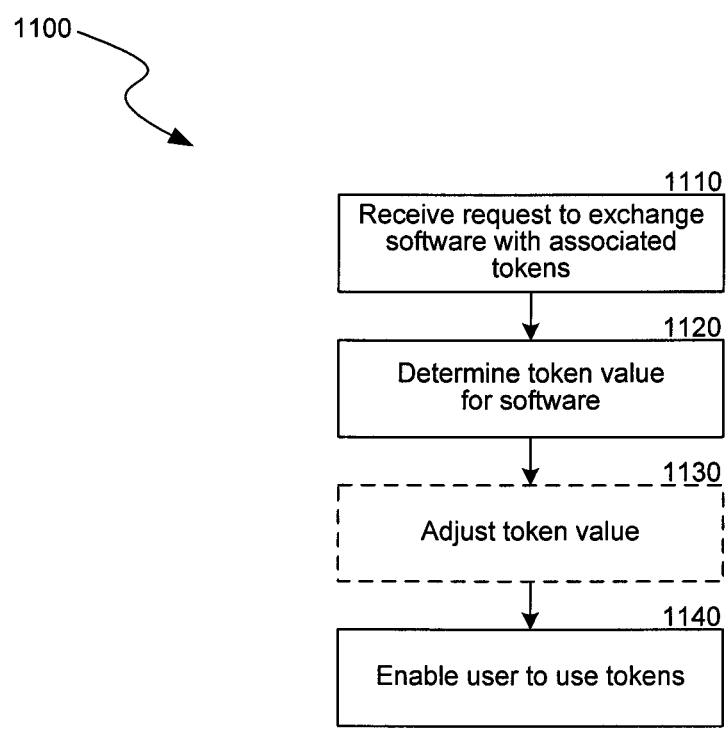
FIG. 11 is a flow diagram illustrating an example routine for exchanging digital content.

Referring to FIG. 11, a flow diagram illustrating an example routine 1100 for exchanging digital content is described. For example, the system may determine that a user does not have enough tokens to obtain requested software, and may provide the user with an option to exchange previously purchased software for additional tokens.

In step 1110, the system may receive a request to exchange software (such as for original tokens or for additional tokens). The system may receive the request and determine, in step 1120, the value of the software to be exchanged. The system may identify the software (or, related token value and token type) by consulting a license key associated with the user and licensed software already in the user's possession, or other information accessible to the software source that contains similar information, such as related data tables 426.

The system may function as a clearinghouse, without the need for knowledge or information related to licenses or other digital rights of digital content being exchanged. For example, the system may receive digital content from a user (or tokens associated therewith) and provide tokens in exchange. The system may regulate the exchange to ensure legitimate digital content is being exchanged.

In step 1130, the system may optionally adjust the determined token values for the software to be exchanged by the user. For example, the system may adjust token values and types based on criteria established by a software source or other entity, to account for changes in the relative value of the software associated with the tokens, such as to adjust for different time periods, market conditions, and so on. In some cases, if a significant period of time has passed or software enhancements have been released since the software to be exchanged was acquired, the system may reduce the value of associated tokens. The system may look to an algorithmically generated decay rate, as described herein.

The system, in step 1140, determines the token value from the software to be exchanged in steps 1120 or 1130 and adds the determined token values to the user's license key. In some cases, the system may add a count to the user, that is, provide credit to the user for the exchange.

In some examples, the system may value digital content with respect to a number of tokens and assign a fixed depreciation value for digital content. That is, once a user exchanges tokens for digital content and later desires to exchange digital content back to the content source, the content source may give user a defined percentage of the original number of tokens associated with the digital content. For example, the digital content source may give the user 80% of the tokens originally associated with the digital content. The system may automatically provide such an exchange, such as looking to a table listing such exchange values. An exchange ratio, such as described herein, may depend on time, but may also depend on the type of digital content being exchanged. For example, the system may factor in the type of content a user is exchange, with or without respect to the type of content the user wishes to receive in the exchange.

In some examples, the system provides a user with a fixed value for tokens that decays as a function of time. For example, if at time T a user exchanges X tokens for software, the system will enable the user to exchange the software back within 30 days of time T for the same number X tokens, that is, for the same value. However, the system enables a user to exchange software for 50% of the original value 90 days or later after time T. The system may also define a limit to any exchanges, such as exchanging zero tokens 1 year after time T.

The system may look to or follow many different functions in valuing tokens or content. The system may utilize a step function, an exponential function, an asymptotical function, a piecewise function, or other functions that change one variable with respect to variations of another. As an example:

$$\text{Token value} = (\text{original value})/(\text{months after original purchase})^{1/2}$$

Thus, in this example, a $100 originally valued token will be valued at $50 four months after the original purchase of the token ($50 = 100/4^{1/2}$), and valued at almost nothing 2 years after the original purchase.

In some examples, the system may account for currency exchange fluctuations, inflation, and other currency market factors. The system may also look to third party data sources, via component 1040, (such as auction sites, top 40 lists, and so on), to assist in valuing content. These sources may provide trend, historical or other data the system uses in determining values.

The system may function as a marketplace for digital content. The system may provide a list of content, and users may bid on content from users, present content for other users, and so on. The system may function as a peer to peer network, enabling users to set rates and determine exchanges of content. In some cases, the system may be for one type of digital content (such as for a gaming service or music download service). In some cases, the system may be for a variety of types of digital content.

For example, a user may enter the system and list their digital content with the system. For example, the user may list one of their games (digital content) at a price of 100 tokens. The system may enable other users to bid on the game, or to purchase the game from the user for the 100 tokens. If the user receives and accepts a bid from another the user, he/she may then apply the 100 tokens in obtaining other content, either directly from other users or from the system.

The system may also set the rate of content for users. The rate may be set as described herein, and the system may consider historical trends or data, dynamically changing data, value fluctuations within the system, and so on. For example, a user may have a copy of a certain game, and would like to exchange the game for tokens, but only at a certain price. The user may set a rule in the system that when the systems reflects or indicates the value of the game at the user set price, the user will exchange the game for the value in tokens. On the other hand, the user may also set a lower limit in case the value of the game decreases. For example, the system may receive an order from a user to exchange the game at a set lower value, allowing the user to receive some credit for the content before the game drops in value. The system may value items of digital content or digital objects based on a number of these factors, including user valuations, historical data, third party data, and so on.

In some examples, the system provides a dynamically changing value based on the market conditions for digital content. For example, the system may set an exchange value for an item of software based on the relative demand by other users to purchase the first item of software or based on the demand by others users to exchange for the item. The system may store and track information relating to transactions involving digital content to assist in dynamically adjusting values for digital content purchases or exchanges.

For example, in system 400 of FIG. 4, many users may be requesting content. In some cases, the licensing module 408 may monitor the user requests and/or exchanges and may adjust token values based on these requests and/or exchanges. In dynamically adjusting values, the system may motivate users to exchange or purchase certain digital content and deter users to other certain content.

For example, a single user exchanged 10 tokens for a WINDOWS 95 agent a year ago, and wants to exchange the agent. The system determines that the user would receive 5 tokens for the exchange. However, in employing dynamic adjustments, a licensing module 108 may determine that thousands of users wish to also exchange a WINDOWS 95 agent for tokens. In this example, the system may decide to increase the exchange value for such an agent to 8 tokens, or 80% of the original token value. The system may do so to provide users with an incentive to exchange or upgrade content. However, in some cases, the system may decide to lower the percentage of an original token value for content.

In some examples, the system may also modify exchange values for tokens and software based on subsequent actions by users, such as a proposed exchange or upgrade to new digital content. The system may determine a user is willing to upgrade or exchange for new content (such as by viewing a survey done by the user) and give a user's tokens a higher value if they are exchanged for the new content.

For example, if a user has WINDOWS 95 and a software source desires to provide an incentive to users to upgrade to WINDOWS 2000, the system 108 may offer a higher number of tokens for a WINDOWS 95 exchange if a user subsequently exchanges the tokens for WINDOWS 2000.

In some examples, the system may facilitate the exchange of any digital content in order to provide incentives for users to obtain new content. For example, users of a music or video download service (or video, ebook, audio book, or other content download service) may benefit from such a system.

For example, a user may enroll in a music download service that sells each song for a fee and may be willing to exchange previously purchased songs to obtain or partially obtain the latest content. The system may determine that the majority of purchases of a song occur in the first few days after the song's release. Using such information, the system may facilitate the exchange of a certain number of aged songs for newly released songs.

For example, a user buys the top 5 songs on January 1st. By February 1st, the user no longer listens to the songs purchased on January 1st and would like to purchase the top 5 songs at that time. The system may provide a similar exchange of rights as described herein. That is, the system may provide a discount on purchased songs for the previously purchased songs. For example, if the service sells an individual song for $0.99, the service would normally change $4.95 to sell 5 songs. However, the service may provide a $0.33 discount for each exchanged song. For example, the system may determine, using components 1030, 1035 and 1040 that the song is no longer a Top 40 song, and value the song (or related token) at a third of its original price. Thus if the user exchanges the previously purchased songs, he/she would receive a credit of $0.33 for each subsequently purchased song up to 5 songs.

Additionally, the system may facilitate the exchange of other content, in some cases related creative content that is constantly updated or created. For example, the system may facilitate the exchange of digital content such as television shows, movies, podcasts, radio broadcasts, concert recordings, lectures, audio chats, and so on.

As described above, the system may function as a peer to peer network of user client systems. The system may enable users to bid, sell, trade, exchange or value content from other users. The system may assist bidding, selling and/or exchanging, such as by setting values (such as token values) for users. The system may assist and/or define rules in trading content, or may set value ceilings or basements. That is, in some examples the system facilitates the exchange of digital content from one user to another, using some or all of the methods described herein.

Conclusion

By providing licenses, such as in the form of tokens, and enabling exchange of tokens for content and content for tokens, a more flexible system for licensing digital content is realized.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. In other words, the software and other modules described herein may be executed by a general-purpose computer, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, via a network, via a browser or other application in an ASP context, or via other means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

Examples of the technology may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Additional examples of software include data storage management software provided by CommVault Systems, Inc. of Oceanport, N.J. CommVault Systems, Inc. provides software module such as data agents, media agents, storage managers and other data storage management components generally in use with CommVault Systems, Inc.'s data storage systems. A data agent may be a software module or part of a software module that is generally responsible for archiving, migrating, and recovering data from a client computer stored in an information store or other memory location. Each client computer may have at least one data agent and a system can support multiple client computers. In some embodiments, data agents may be distributed between client(s) and a storage manager or may be deployed from a remote location or its functions approximated by a remote process that performs some or all of the functions of data agent. Embodiments of the invention may employ multiple data agents each of which may perform a storage operation, e.g., backup, migrate, and recover data associated with a different application. For example, different individual data agents may be designed to handle MICROSOFT EXCHANGE data, Lotus Notes data, MICROSOFT Windows 2000 file system data, MICROSOFT Active Directory Objects data, and other types of data known in the art. Other embodiments may employ one or more generic data agents that can handle and process multiple data types rather than using the specialized data agents described above. Further examples and discussion of data agents and other storage components may be found in U.S. Provisional Patent Application No. 60/752,205, filed on Dec. 19, 2005, entitled SYSTEM AND METHOD FOR PROVIDING A FLEXIBLE LICENSING FOR DIGITAL CONTENT.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While certain aspects of the technology are presented below in certain claim forms, the inventors contemplate the various aspects of the technology in any number of claim forms. For example, while only one aspect of the technology is recited as a means-plus-function claim under 35 U.S.C. sec. 112, sixth paragraph (as employing the terms "means for"), other aspects may likewise be embodied as a means-plus-function claim. Accordingly, the inventors reserve the right to add additional claims after filing the application to pursue such additional claim forms for other aspects of the technology.

The above detailed description of examples of the technology is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the technology provided herein can be applied to other systems, not necessarily the system described above. The elements and acts of the various embodiments described above can be combined to provide further examples. Any patents and applications and other references noted above, including any that may be listed in accompanying filing papers, are incorporated herein by reference. Aspects of the invention can be modified, if necessary, to employ the systems, functions, and concepts of the various references described above to provide yet further examples of the technology.

These and other changes can be made to the invention in light of the above Detailed Description. While the above description describes certain embodiments of the invention, and describes the best mode contemplated, no matter how detailed the above appears in text, the invention can be practiced in many ways. Details of the system and method for classifying and transferring information may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the technology under the claims. While certain aspects of the technology are presented below in certain claim forms, the inventors contemplate the various aspects of the technology in any number of claim forms. For example, while only one aspect of the technology is recited as embodied in a computer-readable medium, other aspects may likewise be embodied in a computer-readable medium. Accordingly, the inventors reserve the right to add additional claims after filing the application to pursue such additional claim forms for other aspects of the technology.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A system for facilitating exchange of digital items between a user and a content source, the system comprising:
    a first computing system comprising computer hardware having one or more computer processors, the first computing system including a user component, and a user storage component that stores at least a first digital item licensed by a user, wherein the first digital item is licensed software comprising a license key, wherein the license key comprises a configuration identifier and a plurality of tokens;
    a second computing system comprising computer hardware having one or more computer processors, the second computing system including a content source component, wherein the content source component stores a second digital item, wherein the second digital item is licensed software;
    a request component, configured to receive a request to exchange the first digital item with the second digital item from the first computing system that stores the first digital item;
    an exchange component, configured to:
        compare the configuration identifier in the license key with the second digital item:
        based on the comparison, confirm compatibility of the second digital item with the first computing system;
        determine a token value of the first digital item by consulting at least the license key;
        dynamically determine based at least on usage of the first digital item, an adjusted token value associated with the exchange of the first digital item with the second digital item;
        increase a number of tokens based on the adjusted token value associated with the first digital item;
        decrement the number of tokens based on a number of tokens associated with the exchange of the first digital item with the second digital item; and
        exchange the first digital item with the second digital item.

2. The system of claim 1, wherein the first digital item and second digital item are audio files.

3. The system of claim 1, wherein the first digital item and second digital item are video files.

4. The system of claim 1, further comprising a valuation component that assigns an adjusted token value for the first digital item after receiving the request from a user to exchange the first digital item with the second digital item.

5. The system of claim 1, further comprising a valuation component that assigns an adjusted token value for the first digital item before receiving the request from the user to exchange the first digital item for the second digital item.

6. The system of claim 1, further comprising a valuation component that assigns a token value for the first digital item based on information related to previous token values of the first digital item.

7. A method in a computing system for facilitating an exchange of a digital object for credit towards other digital objects, the method comprising:
    at a first computing device comprising computer hardware having one or more computer processors, receiving from a second computing device a request to exchange at least a first digital object for credit towards at least one second digital object, wherein the first digital object is licensed software comprising a license key, wherein the license key comprises a configuration identifier and a plurality of tokens,
    wherein the request includes:
        information identifying the first digital object, wherein the first digital object has an original token value; and
        information identifying a requested exchange value for the first digital object that is different than the original token value;
    comparing the configuration identifier in the license key with the at least one second digital object:
    based on said comparing, confirming compatibility of the at least one second digital object with the first computing device;
    determining the original token value for the first digital object by consulting at least the license key;
    dynamically determining based at least on usage of the first digital object, an adjusted token value associated with the exchange of the first digital object with the at least one second digital object;
    increasing a number of tokens based on the adjusted token value associated with the first digital object;
    decrementing the number of tokens based on a number of tokens associated with the exchange of the first digital object with the at least one second digital object; and
    exchanging the first digital object with the at least one second digital object.

8. The method of claim 7, wherein the adjusted token value is further related to the requested exchange value for the first digital object.

9. The method of claim 7, wherein the adjusted token value is further related to a determined current value for the first digital object.

10. The method of claim 7, wherein the adjusted token value for the first digital object comprises determining an age of the first digital object.

11. The method of claim 7, wherein determining the adjusted token value for the first digital object comprises determining content of the first digital object.

12. The method of claim 7, wherein determining the adjusted token value for the first digital object comprises determining a type of the first digital object.

13. The method of claim 7, wherein determining the adjusted token value for the first digital object comprises determining the adjusted token value of the first digital object after receiving a request to exchange the first digital object.

14. A system for transferring digital content from a digital content server computer to a user computer, the system comprising:
    a request receipt component comprising computer hardware having one or more computer processors, the request receipt component configured to receive a request to exchange a first digital object with a second digital object under control of the digital content server computer, wherein the first digital object is licensed software comprising a license key, wherein the license key comprises a configuration identifier and a plurality of tokens;

a validation component configured to compare the configuration identifier in the license key with the second digital object and further configured to, based on the comparison, confirm compatibility of the second digital object with the user computer; and a pricing component located at the digital content server computer, configured to dynamically determine an adjusted token value to the first digital object by consulting at least the license key and a usage of the first digital object; and an exchange component located at the digital content server computer configured to:
- increase a number of tokens based on the adjusted token value associated with the first digital object;
- decrement the number of tokens based on a number of tokens associated with the exchange of the first digital object with the second digital object; and
- transmit the second digital object over a network from the digital content server to the user computer.

15. The system of claim 14, wherein the pricing component determines the adjusted token value for the first digital object by determining a fixed depreciation value from a table listing exchange values.

16. The system of claim 14, wherein the pricing component dynamically determines the adjusted token value based at least in part on currency exchange fluctuations, inflation, or currency market factors.

17. The system of claim 14, wherein the pricing component dynamically determines the adjusted token value based at least in part on third party data sources, wherein the third party data sources include one or more auction sites or top 40 lists, and wherein data from the third party data sources provide trend or historical data that the pricing component uses in determining value.

18. The system of claim 14, wherein the exchange component further comprises receiving a user-set rule to exchange the first digital object when the pricing component indicates that a token value of the first digital object meets a user-set token value.

19. The system of claim 14, wherein the pricing component comprises a decay rate that comprises: assigned value =(original value) / (months after original purchase)$^{1/2}$.

20. The system of claim 14, wherein the pricing component determines the adjusted token value based at least in part on third party data sources that provide trend or historical data.

21. The system of claim 14, wherein the exchange component receives a rule to exchange the second digital object when a token value of the second digital object meets a set token value.

* * * * *

UNITED STATES PATENT AND TRADEMARK OFFICE
CERTIFICATE OF CORRECTION

PATENT NO. : 9,009,076 B2  
APPLICATION NO. : 11/612440  
DATED : April 14, 2015  
INVENTOR(S) : Muller et al.

Page 1 of 1

It is certified that error appears in the above-identified patent and that said Letters Patent is hereby corrected as shown below:

In the claims

Column 19 line 42, Claim 1, change "item:" to --item;--.

Column 20 line 25, Claim 7, change "object:" to --object;--.

Signed and Sealed this
Nineteenth Day of January, 2016

Michelle K. Lee
*Director of the United States Patent and Trademark Office*